United States Patent [19]
Collinsworth

[11] Patent Number: 5,413,415
[45] Date of Patent: May 9, 1995

[54] ROTARY TABLE DECK BUSHING

[76] Inventor: Stephen M. Collinsworth, P.O. Box 358, Stanton, Ky. 40380

[21] Appl. No.: 217,275

[22] Filed: Mar. 24, 1994

[51] Int. Cl.6 .......................... F16C 43/06; E21C 9/00
[52] U.S. Cl. ..................................... 384/508; 175/220
[58] Field of Search ............... 384/24, 92, 97, 507, 384/508, 510; 175/220

[56] References Cited

U.S. PATENT DOCUMENTS

| | | | |
|---|---|---|---|
| 3,148,922 | 9/1964 | Roessler, Jr. | 384/508 |
| 3,951,470 | 4/1976 | McLean | 175/220 X |
| 4,906,113 | 3/1990 | Sague | 384/507 X |
| 5,033,873 | 7/1991 | Suzuki | 384/508 X |
| 5,097,565 | 3/1992 | Shorey | 384/508 X |

*Primary Examiner*—Thomas R. Hannon
*Attorney, Agent, or Firm*—Frank C. Leach, Jr.

[57] ABSTRACT

An outer sleeve of a rotary table deck bushing has an axial passage extending therethrough and within which is disposed an inner core, which has an axial passage extending therethrough to receive a drill string of a drilling tool. The inner surface of the outer sleeve and the outer surface of the inner core have cooperating bearing races to form raceways within which are disposed ball bearings to rotatably support the inner core within the outer sleeve. Each of the raceways communicates with an access passage extending through the outer sleeve to enable ball bearings to be supplied to the raceway and removed therefrom. The outer sleeve supports a slidable key for blocking each of the access passages when the slidable key is in its blocking position. The slidable key is retained in its blocking position on the outer sleeve by a set screw.

21 Claims, 3 Drawing Sheets

ROTARY TABLE DECK BUSHING

This invention relates to a rotary table deck bushing and, more particularly, to a rotary table deck bushing for a drill string of a drilling tool.

A rotary table deck bushing functions as a stabilizer for a drill string of a drilling tool extending therethrough. The rotary table has a recess in its deck or upper surface to receive the deck bushing, which has an inner core rotatably supported within an outer sleeve having an axial passage to receive the drill string. The deck bushing has cooperating means on a flange, which is secured to one end of the outer sleeve, for cooperating with a projection extending from the recess wall to prevent rotation of the outer sleeve of the deck bushing.

The inner core is formed of a softer material than the material of the drill string of the drilling tool extending through an axial passage in the inner core or the material of the outer sleeve. This enables vibrations of the drill string to be reduced without wear on the drill string through the drill string engaging the passage wall of the inner core because of the vibrations and causing non-continuous rotation of the inner core. This intermittent engagement of the drill string with the softer material of the inner core of the deck bushing causes the inner core to wear so that it eventually ceases to function properly and must be replaced.

When the inner core has worn, the deck bushing has previously been rebuilt through replacing the inner core and the ball bearings between the inner core and the outer sleeve. The deck bushing must be sent to a machine shop where a new inner core and new ball bearings are installed. When the deck bushing is removed from the rotary table recess, a new deck bushing must be installed while the old deck bushing is being rebuilt. To remove the deck bushing, it must be removed from the drill string of the drilling tool extending therethrough.

To load the ball bearings in raceways, which are formed by cooperating races in the inner surface of the outer sleeve and the outer surface of the inner core, a separate access passage extends from the outer surface of the outer sleeve or case into each race in the outer sleeve. When loading of the ball bearings in the raceways is completed, a plug is welded in each of the access passages to retain the ball bearings within the raceways. Therefore, the inner core cannot be easily or economically replaced by a user at the site.

The rotary table deck bushing of the present invention is capable of having the inner core replaced at the site by the user. This reduces the total cost of replacing the inner core of the rotary table deck bushing by 30–50%.

The inner core of the rotary table deck bushing of the present invention can be replaced at the site through having removably mounted blocking means for blocking all of the ball bearing access passages in the outer sleeve. Thus, when the inner core must be replaced, it is only necessary to remove the removably mounted blocking means from the outer sleeve whereby the ball bearings may be easily removed from each of the raceways through the communicating access passage in the outer sleeve. With the ball bearings removed, the inner core may be withdrawn from the interior of the outer sleeve.

A new inner core is then disposed within the outer sleeve, and ball bearings are added through the access passages to each of the raceways, which are formed between the races in the inner surface of the outer sleeve and the outer surface of the inner core. When the raceways are fully loaded with the ball bearings, each of the access passages is closed by the removably mounted blocking means being releasably locked to the outer sleeve.

Therefore, it is not necessary to replace the deck bushing with a new deck bushing and take the replaced deck bushing to a machine shop to be rebuilt. The present invention requires only an inner core and ball bearings to be stored at the site for replacement rather than a new deck bushing.

An object of this invention is to provide an improved rotary table deck bushing.

Another object of this invention is to provide a rotary table deck bushing capable of having its inner core replaced at its use site.

Other objects of this invention will be readily perceived from the following description, claims, and drawings.

This invention relates to a rotary table deck bushing including an outer sleeve having an axial passage extending therethrough and an inner core disposed within the axial passage in the outer sleeve. The outer sleeve has at least one bearing race in its inner surface defining the axial passage and the inner core has at least one bearing race in its outer surface with the inner core and the outer sleeve having the same number of the bearing races. The one bearing race in the outer sleeve cooperates with the one bearing race in the inner core to form a raceway therebetween. Ball bearings are disposed within the raceway. The inner core, which has an axial passage extending therethrough to receive a drill string of a drilling tool, is formed of a metal softer than the metal of the drill string extending through its axial passage or the metal of the outer sleeve. The outer sleeve has at least one access passage extending therethrough from its exterior to communicate with the one bearing race in the inner surface of the outer sleeve to enable the ball bearings to be supplied to the raceway and removed therefrom. The number of the access passages is equal to the number of the bearing races in the outer sleeve. Removable blocking means blocks each of the access passages in the outer sleeve when the removable blocking means is in its blocking position. Retaining means retains the removable blocking means in its blocking position.

The attached drawings illustrate a preferred embodiment of the invention, in which.

Figure 1:
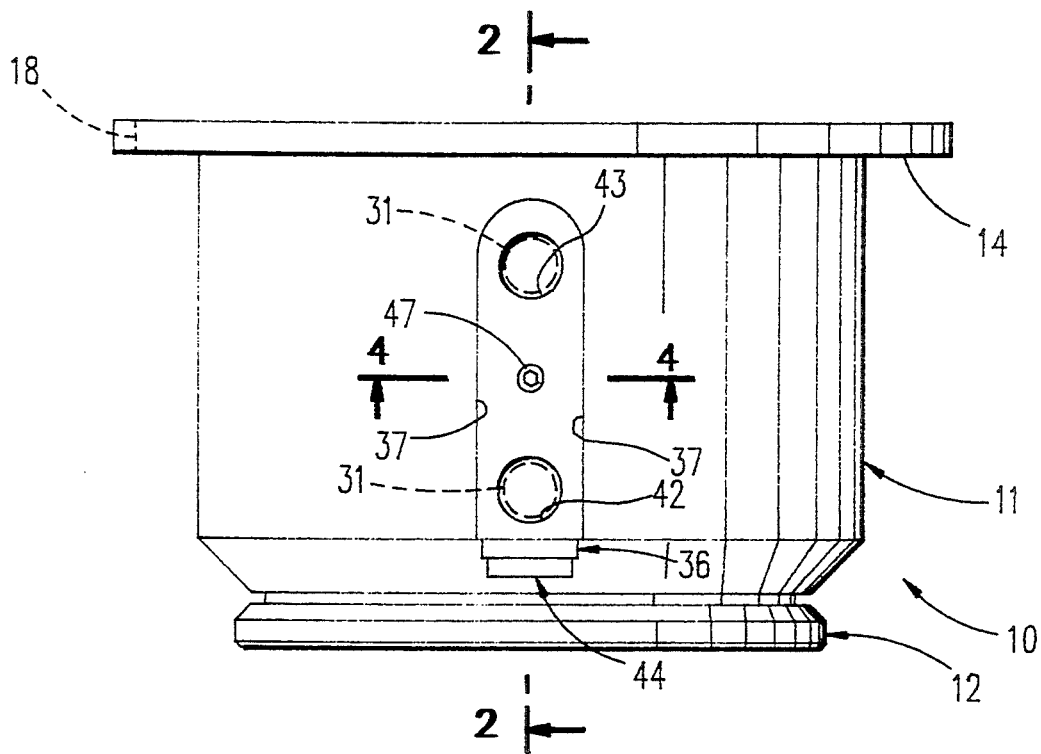
FIG. 1 is a side elevational view of a rotary table deck bushing of the present invention.

Referring to the drawings and particularly FIG. 1, there is shown a rotary table deck bushing 10. The rotary table deck bushing 10 includes an outer sleeve or case 11 and an inner core 12.

Figure 3:
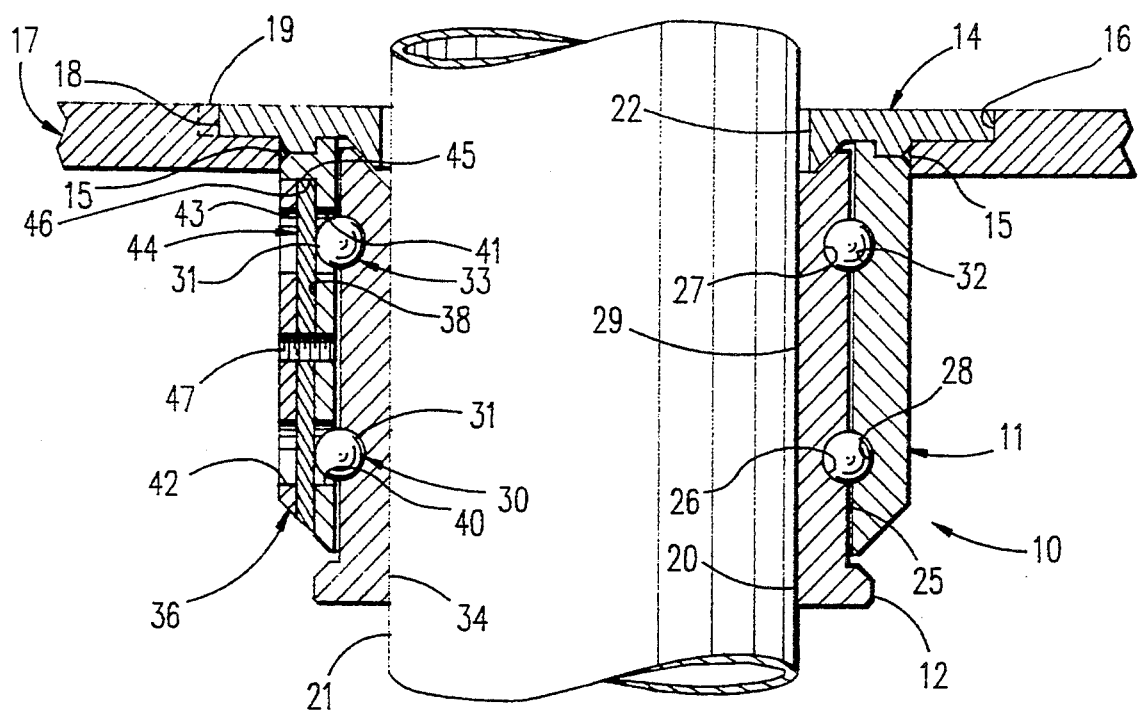
FIG. 3 is a vertical sectional view, similar to FIG. 2, taken along line 2—2 of FIG. 1 but showing the slidable key in its ball bearing blocking position and a drill string of a drilling tool extending through the rotary table deck bushing with the rotary table deck bushing disposed in a recess of a rotary table.

The outer sleeve 11 has a flange 14 attached to its top end through a circumferential weld 15 (see FIG. 3). The flange 14 is disposed within a recess 16 in a rotary table 17. The flange 14 has a cut out portion 18 to receive a projection 19 extending from the side wall of the recess 16 to prevent rotation of the rotary table deck bushing 10 when the rotary table deck bushing 10 is supported in the recess 16 in the rotary table 17.

The inner core 12 has an axial passage 20 extending therethrough to receive a drill section 21 of a drill string of a drilling tool. The drill section 21 also extends through an opening 22 in the flange 14.

Figure 2:
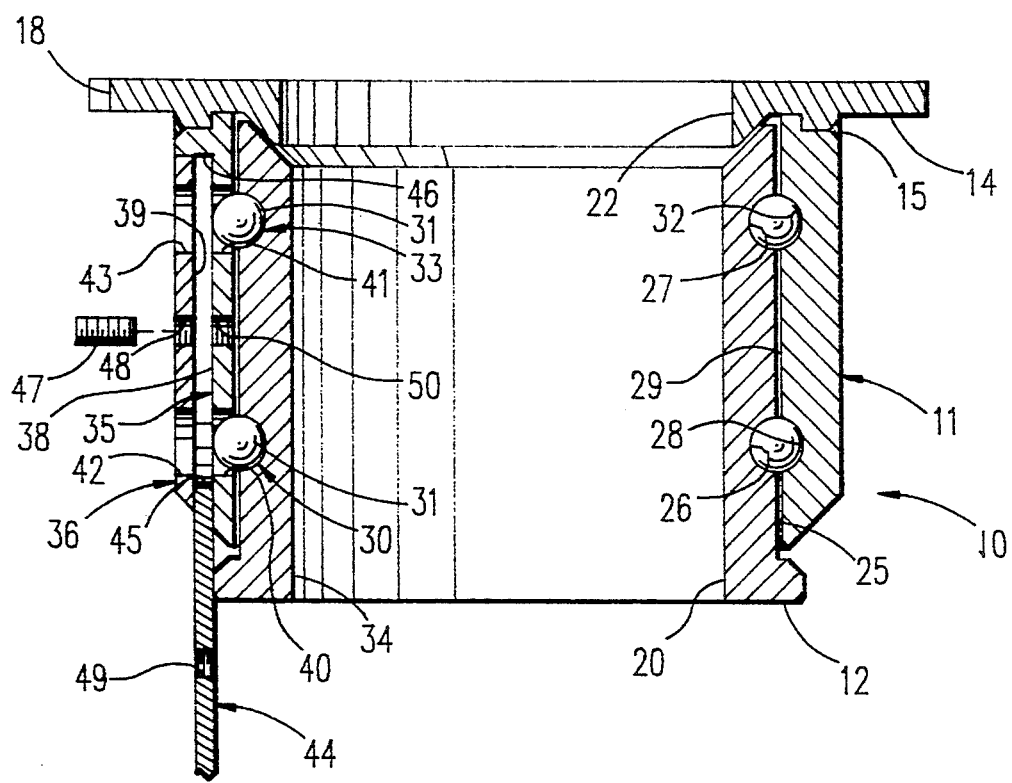
FIG. 2 is a vertical sectional view of the rotary table deck bushing of FIG. 1 taken along line 2—2 of FIG. 1 and showing a slidable key in a non-blocking position to allow ball bearings to be added to raceways of the rotary table deck bushing.

The inner core 12 has its outer surface 25 (see FIG. 2) formed with two circumferential races or grooves 26 and 27. The race or groove 26 cooperates with a race or groove 28 in an inner surface 29 of the outer sleeve 11 to form a raceway 30 within which are disposed ball bearings 31. The race 27 cooperates with a race or groove 32 in the inner surface 29 of the outer sleeve 11 to form a raceway 33 within which are disposed the ball bearings 31. Thus, the inner core 12 is rotatable relative to the outer sleeve 11.

The drill section 21 (see FIG. 3) of the drill string of the drilling tool is rotated to advance a drill bit (not shown) on the bottom end of the drill string into the earth, for example. Vibrations of the drill section 21 cause the drill section 21 to engage with an inner surface 34, which defines the axial passage 20, of the inner core 12. This causes the inner core 12 to have non-continuous rotation through engagement with the drill section 21 because of its vibrations during its rotation. This non-continuous rotation of the inner core 12 reduces the vibrations of the drill section 21 and the other connected drill sections of the drill string of the drilling tool.

Figure 8:
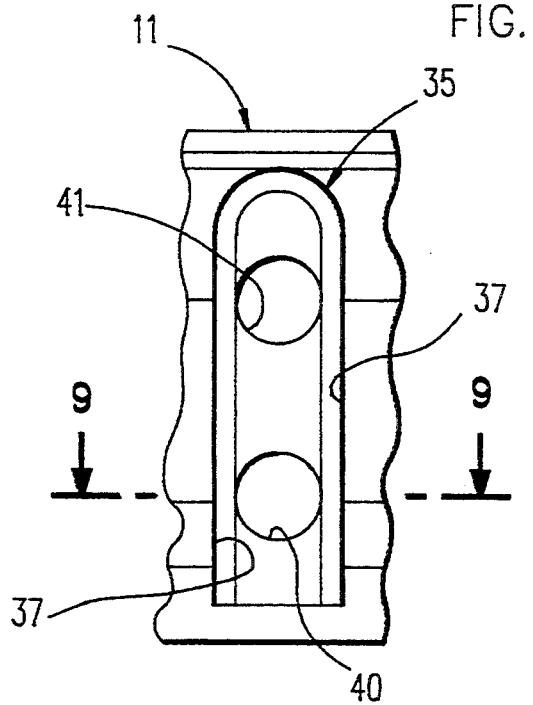
FIG. 8 is a fragmentary elevational view of a portion of an outer sleeve of the rotary table deck bushing of FIG. 1 prior to the bridging plate being mounted thereon.
Figure 9:
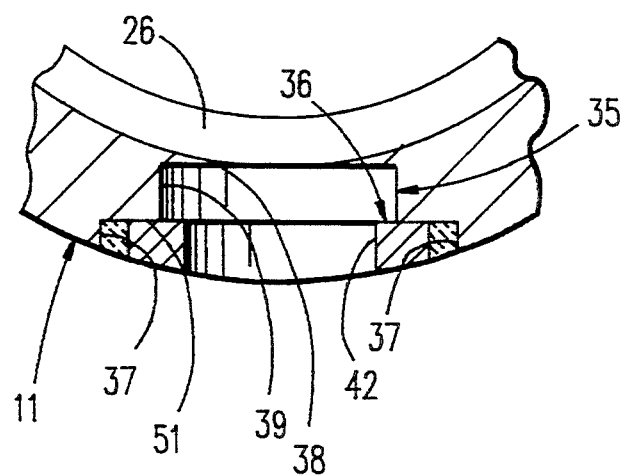
FIG. 9 is a fragmentary sectional view of a portion of the outer sleeve of FIG. 8 with the bridging plate mounted thereon and taken along line 9—9 of FIG. 8.

As shown in FIG. 9, the outer sleeve 11 has a milled out portion 35 within which is disposed a bridging plate 36. The bridging plate 36 is welded to the outer sleeve 11 at edges 37 (see FIG. 8) of the milled out portion 35. The bridging plate 36 (see FIG. 9) is spaced from a flat surface 38, which is produced by forming the milled out portion 35 and constitutes the inner surface of the milled out portion 35, of the outer sleeve 11 to form a recess 39 therebetween.

The outer sleeve 11 (see FIG. 2) has a first access passage 40 extending inwardly from the flat surface 38 of the milled out portion 35 into the race 26 in the outer sleeve 11. A second access passage 41 in the outer sleeve 11 similarly communicates with the race 27.

The bridging plate 36 has a first access passage 42 aligned with the first access passage 40 in the outer sleeve 11 to enable the ball bearings 31 to pass therethrough into the raceway 30. The bridging plate 36 has a second access passage 43 aligned with the second access passage 41 to allow the ball bearings 31 to enter the raceway 33.

Thus, the ball bearings 31 may be loaded into each of the raceways 30 and 33 to fill each of the raceways 30 and 33 with the ball bearings 31. Then, a slidable key 44 is inserted into the recess 39 until its end 45 abuts against end 46 of the recess 39 as shown in FIG. 3. In this position, communication of the first access passage 42 in the bridging plate 36 with the first access passage 40 in the outer sleeve 11 is prevented along with communication of the second access passage 43 in the bridging plate 36 with the second access passage 41 in the outer sleeve 11. This retains the ball bearings 31 within the raceways 30 and 33.

A set screw 47 extends through a threaded passage 48 (see FIG. 2) in the bridging plate 36, a threaded passage 49 in the slidable key 44, and a threaded passage 50 in the outer sleeve 11. This releasably locks the slidable key 44 to both the bridging plate 36 and the outer sleeve 11 to retain the slidable key 44 in its blocking position.

Before the milled out portion 35 is formed within the outer sleeve 11, two 1″ holes are drilled from the outer surface of the outer sleeve 11 into the races 26 and 27. As shown in FIG. 8, these drilled holes define the first access passage 40 and the second access passage 41 in the outer sleeve 11.

Figure 4:
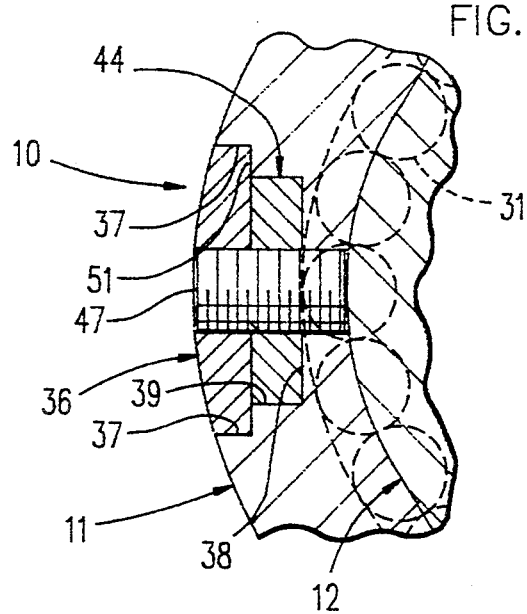
FIG. 4 is a fragmentary sectional view of a portion of the rotary table deck bushing of FIG. 1 and taken along line 4—4 of FIG. 1.

In forming the outer sleeve 11 with the bridging plate 36 (see FIG. 9), the milled out portion 35 is produced by initially using a 1″ end mill from the outer surface of the outer sleeve 11 until the milled out portion 35 produces the flat surface 38. The flat surface 38 is in a plane tangent to each of the races 26 and 27 (see FIG. 2) at its outer surface. This enables the ball bearings 31 in each of the raceways 30 and 33 to only engage the slidable key 44 at one point through each of the first access passage 40 and the second access passage 41 when the slidable key 44 is disposed within the recess 39 as shown in FIGS. 3 and 4.

After the 1″ end mill has completed milling, a 1½″ end mill mills out a larger and outer part of the milled out portion 35 (see FIG. 9). This enables the bridging plate 36 to be disposed within the milled out portion 35 and engage a shoulder 51, which is at the intersection of the 1½″ milled out part and the remaining 1″ milled out part of the milled out portion 35. The bridging plate 36, which has a width of 1.25″, is then welded within the 1½″ milled out part of the milled out portion 35.

Figure 5:
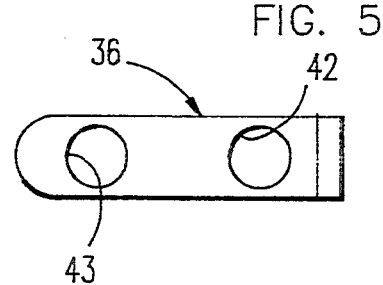
FIG. 5 is a front elevational view of a bridging plate used with the rotary table deck bushing of FIG. 1.
Figure 6:
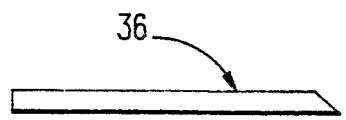
FIG. 6 is a side elevational view of the bridging plate of FIG. 5.
Figure 7:
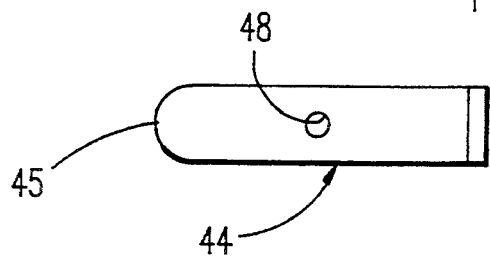
FIG. 7 is a side elevational view of a sliding key used with the rotary table deck bushing of FIG. 1 to block ball bearing access passages in an outer sleeve of the rotary table deck bushing.

After the bridging plate 36 is welded in position, the first access passage 42 (see FIG. 5) and the second access passage 43 are drilled into the bridging plate 36. These are aligned with the first access passage 40 (see FIG. 2) and the second access passage 41, respectively, in the outer sleeve 11. The bridging plate 36 is machined on its outer contour to conform with the periphery of the outer sleeve 11 as shown in FIG. 4.

Next, the threaded passage 48 (see FIG. 2) in the bridging plate 36, the threaded passage 49 in the slidable key 44, and the threaded passage 50 in the outer sleeve 11 are formed by tapping. This occurs with the slidable key 44 in the position in which the end 45 of the slidable key 44 abuts the end 46 of the recess 39 as shown in FIG. 3.

When it is desired to replace the inner core 12, it is necessary to remove the rotary table deck bushing 10 from the drill section 21. Then, the slidable key 44 is moved to the position of FIG. 2 and all of the ball bearings 31 are removed from the raceways 30 and 33. Removal of the ball bearings 31 allows the inner core 12 to be easily removed from the outer sleeve 11 and replaced by a new one of the inner cores 12. Then, the new ball bearings 31 are supplied to the raceways 30 and 33. When the raceways 30 and 33 are filled, the slidable key 44 is returned to the position of FIG. 3, and the set screw 47 is threaded through the threaded passages 48 (see FIG. 2), 49, and 50 to lock the slidable key 44 against movement. Finally, the rotary table deck bushing 10 is mounted on the drill section 21.

One example of the relation of some of the parts is that the drill string 21 (see FIG. 3) has an outer diameter of 5.5″, the diameter of the axial passage 20 in the inner core 12 is at least 0,150″ larger than the outer diameter of the drill string 21, and the diameter of the opening 22 in the flange 14 is at least 0.5″ larger than the outer diameter of the drill string 21.

An advantage of this invention is that it significantly decreases the cost to replace the inner core of a rotary table deck bushing. Another advantage of this invention is that the time for taking a rotary table deck bushing to a machine shop and picking it up after being rebuilt is avoided.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A rotary table deck bushing including:
   an outer sleeve having an axial passage extending therethrough;
   an inner core disposed within said axial passage in said outer sleeve;
   said outer sleeve having at least one bearing race in its inner surface defining said axial passage;
   said inner core having at least one bearing race in its outer surface, said inner core and said outer sleeve having the same number of said bearing races;
   said one bearing race in said outer sleeve cooperating with said one bearing race in said inner core to form a raceway therebetween;
   ball bearings disposed within said raceway;
   said inner core having an axial passage extending therethrough to receive a drill string of a drilling tool;
   said inner core being formed of a metal softer than the metal of the drill string extending through said axial passage in said inner core or the metal of said outer sleeve;
   said outer sleeve having at least one access passage extending therethrough from its exterior to communicate with said one bearing race in said inner surface of said outer sleeve to enable said ball bearings to be supplied to said raceway and removed therefrom, the number of said access passages being equal to the number of said bearing races in said outer sleeve;
   removable blocking means for blocking each of said access passages in said outer sleeve when said removable blocking means is in its blocking position;
   said removable blocking means having a substantially flat surface substantially parallel to the longitudinal axis of said outer sleeve when said removable blocking means is in its blocking position, said substantially flat surface of said removable blocking means engaging one of said ball bearings through at least said one access passage with only a single point contact so that said removable blocking means is load bearing when said removable blocking means is in its blocking position;
   and retaining means for retaining said removable blocking means in its blocking position so that said substantially flat surface of said removable blocking means is substantially parallel to the longitudinal axis of said outer sleeve.

2. The rotary table deck bushing according to claim 1 in which said removable blocking means includes:
   a slidable element supported by said outer sleeve at least when said slidable element is in its blocking position;
   and said slidable element being movable between its blocking position and a non-blocking position.

3. The rotary table deck bushing according to claim 2 in which said retaining means includes means for releasably locking said slidable element to said outer sleeve.

4. The rotary table deck bushing according to claim 3 in which: said outer sleeve has a plurality of said bearing races in its inner surface;
   said inner core has a plurality of said bearing races in its outer surface;
   and each of said bearing races in said outer sleeve cooperates with one of said bearing races in said inner core to form a raceway therebetween for said ball bearings.

5. The rotary table deck bushing according to claim 2 in which: said outer sleeve has a plurality of said bearing races in its inner surface;
   said inner core has a plurality of said bearing races in its outer surface;
   and each of said bearing races in said outer sleeve cooperates with one of said bearing races in said inner core to form a raceway therebetween for said ball bearings.

6. The rotary table deck bushing according to claim 1 including said outer sleeve having receiving means for receiving said removable blocking means so that said removable blocking means can move only substantially parallel to the longitudinal axis of said outer sleeve within said receiving means.

7. The rotary table deck bushing according to claim 6 in which said releasably locking means includes means releasably locking said slidable element to said bridging plate and said outer sleeve when said slidable element is in its blocking position in said recess.

8. The rotary table deck bushing according to claim 1 in which:
   said outer sleeve has a plurality of said bearing races in its inner surface;
   said inner core has a plurality of said bearing races in its outer surface;
   and each of said bearing races in said outer sleeve cooperates with one of said bearing races in said inner core to form a raceway therebetween for said ball bearings.

9. The rotary table deck bushing according to claim 1 in which said retaining means includes means for releasably locking said removable blocking means to said outer sleeve.

10. A rotary table deck bushing including:
    an outer sleeve having an axial passage extending therethrough;

an inner core disposed within said axial passage in said outer sleeve;

said outer sleeve having at least one bearing race in its inner surface defining said axial passage;

said inner core having at least one bearing race in its outer surface, said inner core and said outer sleeve having the same number of said bearing races;

said one bearing race in said outer sleeve cooperating with said one bearing race in said inner core to form a raceway therebetween;

ball bearings disposed within said raceway;

said inner core having an axial passage extending therethrough to receive a drill string of a drilling tool;

said inner core being formed of metal softer than the metal of the drill string extending through said axial passage in said inner core or the metal of said outer sleeve;

said outer sleeve having at least one access passage extending therethrough from its exterior to communicate with said one bearing race in said inner surface of said outer sleeve to enable said ball bearings to be supplied to said raceway and removed therefrom, the number of said access passages being equal to the number of said bearing races in said outer sleeve;

removable blocking means for blocking each of said access passages in said outer sleeve when said removable blocking means is in its blocking position;

retaining means for retaining said removable blocking means in its blocking position;

said outer sleeve having a cut out portion in an area of its exterior surface having each of said access passages, said cut out portion extending inwardly to its inner surface defined by said outer sleeve;

a bridging plate fixed in said cut out portion to close said cut out portion at the exterior surface of said outer sleeve, said bridging plate having its outer surface conforming to the exterior surface of said outer sleeve and its inner surface spaced from the inner surface of said cut out portion;

said outer sleeve having a recess between the inner surface of said cut out portion and the inner surface of said bridging plate and communicating exterior of said outer sleeve to receive said removable blocking means;

and said bridging plate having means for communicating the exterior of said bridging plate with each of said access passages in said outer sleeve to enable said ball bearings to be supplied through said bridging plate to each of said access passages and removed therefrom when said removable blocking means is in its non-blocking position.

11. The rotary table deck bushing according to claim 10 in which said retaining means includes means for releasably locking said removable blocking means to said bridging plate and said outer sleeve when said removable blocking means is in its blocking position in said recess.

12. The rotary table deck bushing according to claim 10 in which:

said outer sleeve has a plurality of said bearing races in its inner surface;

said inner core has a plurality of said bearing races in its outer surface;

and each of said bearing races in said outer sleeve cooperates with one of said bearing races in said inner core to form a raceway therebetween for said ball bearings.

13. The rotary table deck bushing according to claim 10 in which:

said removable blocking means includes:

a slidable element supported by said outer sleeve at least when said slidable element is in its blocking position;

and said slidable element being movable between its blocking position and a non-blocking position;

said retaining means includes means for releasably locking said slidable element to said outer sleeve;

said outer sleeve has a plurality of said bearing races in its inner surface;

said inner core has a plurality of said bearing races in its outer surface;

and each of said bearing races in said outer sleeve cooperates with one of said bearing races in said inner core to form a raceway therebetween for said ball bearings.

14. The rotary table deck bushing according to claim 13 in which said releasably locking means includes means releasably locking said slidable element to said bridging plate and said outer sleeve when said slidable element is in its blocking position in said recess.

15. The rotary table deck bushing according to claim 10 in which:

said removable blocking means includes:

a slidable element supported by said outer sleeve at least when said slidable element is in its blocking position;

and said slidable element being movable between its blocking position and a non-blocking position;

and said retaining means includes means for releasably locking said slidable element to said outer sleeve.

16. The rotary table deck bushing according to claim 15 in which said retaining means includes means for releasably locking said slidable element to said bridging plate and said outer sleeve when said slidable element is in its blocking position in said recess.

17. The rotary table deck bushing according to claim 10 in which:

said removable blocking means includes:

a slidable element supported by said outer sleeve at least when said slidable element is in its blocking position;

and said slidable element being movable between its blocking position and a non-blocking position;

said outer sleeve having a plurality of said bearing races in its inner surface;

said inner core having a plurality of said bearing races in its outer surface;

and each of said bearing races in said outer sleeve cooperating with one of said bearing races in said inner core to form a raceway therebetween for said ball bearings.

18. The rotary table deck bushing according to claim 17 in which said retaining means includes means for releasably locking said slidable element to said bridging plate and said outer sleeve when said slidable element is in its blocking position in said recess.

19. The rotary table deck bushing according to claim 10 in which said removable blocking means includes:

a slidable element supported by said outer sleeve at least when said slidable element is in its blocking position;

and said slidable element being movable between its blocking position and a non-blocking position.

20. The rotary table deck bushing according to claim 19 in which said retaining means includes means for releasably locking said removable blocking means to said bridging plate and said outer sleeve when said removable blocking means is in its blocking position in said recess.

21. A rotary table deck bushing including:
an outer sleeve having an axial passage extending therethrough;
an inner core disposed within said axial passage in said outer sleeve;
said outer sleeve having a plurality of bearing races in its inner surface defining said axial passage;
said inner core having a plurality of bearing races in its outer surface, said inner core and said outer sleeve having the same number of said bearing races;
each of said bearing races in said outer sleeve cooperating with one of said bearing races in said inner core to form a raceway therebetween;
ball bearings disposed within each of said raceways;
said inner core having an axial passage extending therethrough to receive a drill string of a drilling tool;
said inner core being formed of a metal softer than the metal of the drill string extending through said axial passage in said inner core or the metal of said outer sleeve;
said outer sleeve having a plurality of access passages extending therethrough from its exterior, each of said access passages communicating with one of said bearing races in said inner surface of said outer sleeve to enable said ball bearings to be supplied to each of said raceways and removed therefrom, the number of said access passages being equal to the number of said bearing races in said outer sleeve;
removable blocking means for blocking each of said access passages in said outer sleeve when said removable blocking means is in its blocking position;
retaining means for retaining said removable blocking means in its blocking position;
and said retaining means including means for releasably locking said removable blocking means to said outer sleeve.

* * * * *